Sept. 30, 1958 W. J. GUTKNECHT 2,854,336
METHOD OF FORMING A TWO-LEVEL PHOTOENGRAVED
EMBOSSING PLATE OR MOLD
Filed March 7, 1955 2 Sheets-Sheet 1
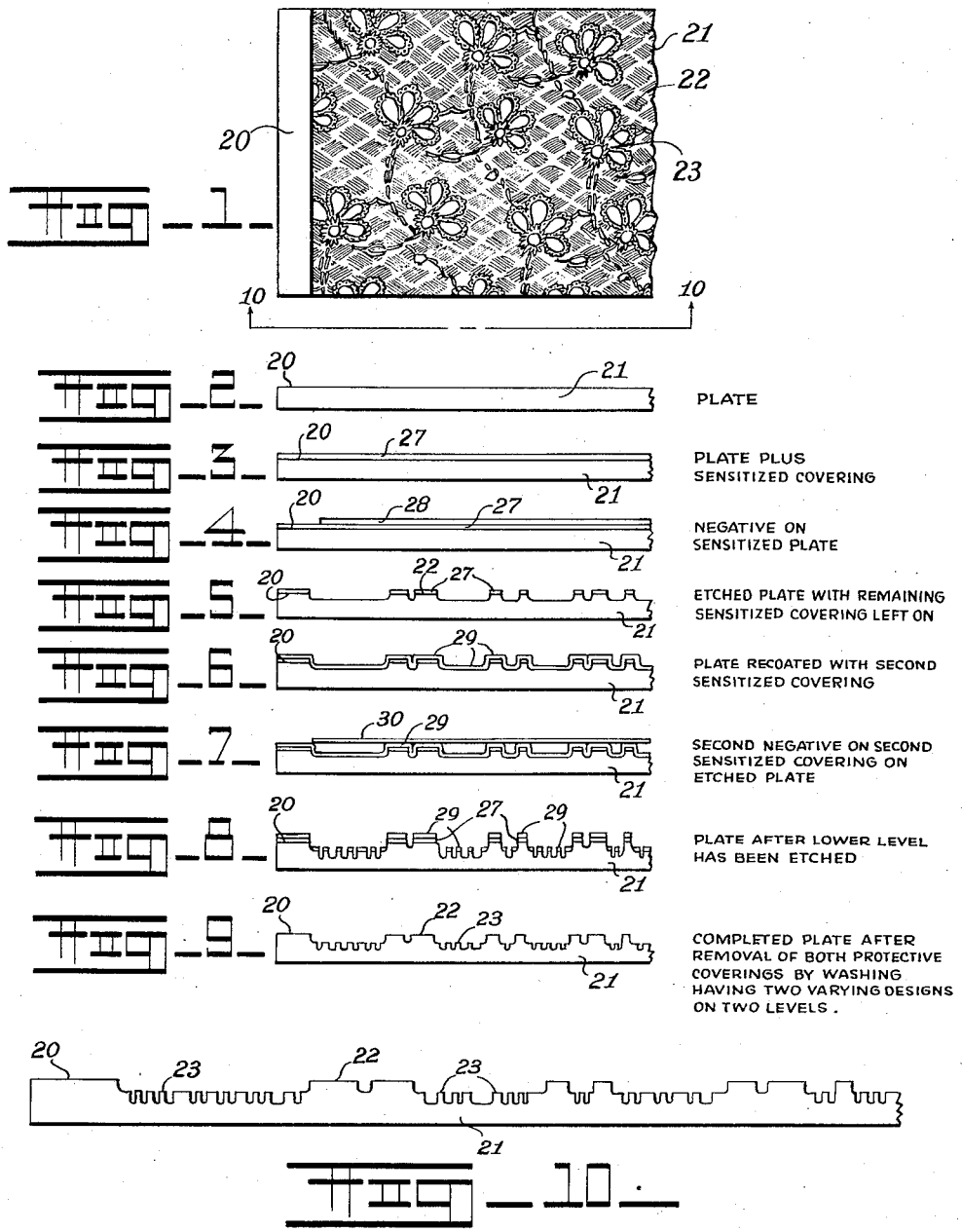
INVENTOR.
William J. Gutknecht
BY
ATTORNEY Sept. 30, 1958     W. J. GUTKNECHT     2,854,336
METHOD OF FORMING A TWO-LEVEL PHOTOENGRAVED
EMBOSSING PLATE OR MOLD Filed March 7, 1955     2 Sheets-Sheet 2

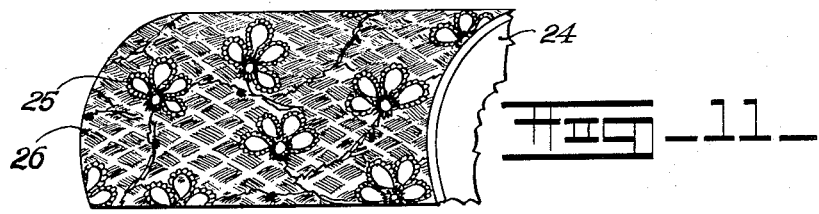

SECOND SENSITIZED
COVERING ON ROLL

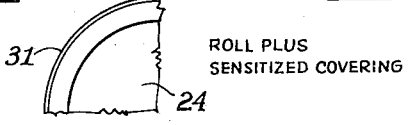

ROLL

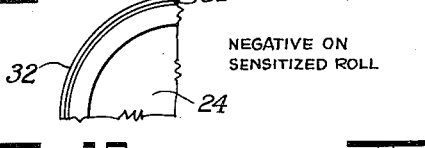

ROLL PLUS
SENSITIZED COVERING

SECOND NEGATIVE
ON ROLL

NEGATIVE ON
SENSITIZED ROLL

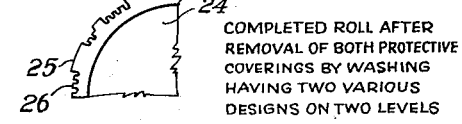

ROLL AFTER LOWER LEVEL
HAS BEEN ETCHED

ETCHED ROLL WITH
COVERING REMAINING

COMPLETED ROLL AFTER
REMOVAL OF BOTH PROTECTIVE
COVERINGS BY WASHING
HAVING TWO VARIOUS
DESIGNS ON TWO LEVELS

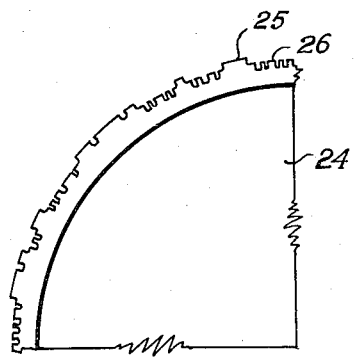

INVENTOR.
William J. Gutknecht
BY
ATTORNEY

United States Patent Office
2,854,336
Patented Sept. 30, 1958

2,854,336

METHOD OF FORMING A TWO-LEVEL PHOTO-ENGRAVED EMBOSSING PLATE OR MOLD

William J. Gutknecht, Youngstown, Ohio, assignor to The Youngstown Arc Engraving Company, Youngstown, Ohio, a corporation of Ohio Application March 7, 1955, Serial No. 492,515

2 Claims. (Cl. 96—36)

This invention relates to the production of a plate, roll or other object with a two-level photoengraved design, from which plate, roll or other object articles may be embossed with the design or formed thereon to incorporate the two-level design.

The principal object of the invention is the provision of a method of producing a two-level photoengraving, one level of which includes a primary design and the other level of which includes a background design.

In producing a plate, roll or other object on which an article may be formed to incorporate the design thereof or by means of which an article may be embossed to receive the design thereof, it has heretofore been believed necessary to either hand-tool the design in the plate, roll or other object or to form the design therein by a photo-engraving process incorporating etching. Some plates, rolls or other objects have incorporated both of these processes as, for example, those plates heretofore used in the formation of embossed covers as used on year books, annuals, etc., as published by various educational institutions.

Such embossing plates, rolls and other objects as have been heretofore produced with a primary design and a secondary or background design have of necessity been difficult to prepare, expensive and time consuming and the necessity of manual engraving rendered the same extremely difficult when complicated designs were employed. With the present invention such designs may be simply, relatively inexpensively, and quickly produced whereby various attractive primary designs and secondary or background designs may be used and various articles embossed therefrom or, alternately, formed thereon with the plate, roll or other object forming a mold-like device.

According to the present invention, a method is disclosed which produces a two-level photoengraving on a plate, roll or other object, which plate, roll or other object may be directly used in embossing the two-level design or alternately used as a mold for the formation of another article.

The above objects, together with others which will be apparent from the drawings and the following description, may be attained by carrying out the process for forming two-level photoengravings in the manner hereinafter described in detail and illustrated in the accompanying drawings, it being the intention to cover all changes and modifications of the examples of the invention herein chosen for the purpose of the disclosure which do not constitute departures from the spirit and scope of the invention.

The invention is illustrated in the accompanying drawings, wherein:

Figure 1 is a plan view of a portion of a plate showing a two-level photoengraving formed thereon.

Figure 2 is an enlarged end elevation of a plate.

Figure 3 is an enlarged end elevation of a plate plus a sensitized covering.

Figure 4 is an enlarged end elevation of a negative on a sensitized plate.

Figure 5 is an enlarged end elevation of an etched plate with the sensitized covering left thereon.

Figure 6 is an enlarged end elevation of an etched plate with a sensitized covering re-coated with a second sensitized covering.

Figure 7 is an enlarged end elevation of a second negative on a second sensitized covering of an etched plate.

Figure 8 is an enlarged end elevation after the lower level has been etched wtih the sensitized coverings left thereon.

Figure 9 is an enlarged end elevation of a completed plate having two varying designs on different levels.

Figure 10 is an enlarged detail of the plate shown in Figure 9 of the drawings.

Figure 11 is a portion of a roll showing a two-level photoengraving formed thereon.

Figure 12 is an enlarged end elevation of a portion of a roll.

Figure 13 is an enlarged end elevation of a portion of a roll plus a sensized covering.

Figure 14 is an enlarged end elevation of a negative on a portion of a sensitized roll.

Figure 15 is an enlarged end elevation of a portion of an etched roll with sensitized covering left thereon.

Figure 16 is an enlarged end elevation of a portion of an etched roll with a second sensitized covering.

Figure 17 is an enlarged end elevation of a portion of a roll with a second negative over the sensitized second covering thereof.

Figure 18 is an enlarged end elevation of a portion of a roll after the same has been etched the second time.

Figure 19 is an enlarged end elevation of a portion of a completed roll with the sensitized coverings removed and showing the two varying designs on two levels.

Figure 20 is an enlarged detail of a portion of the completed roll shown in Figure 19.

By referring to the drawings and Figure 1 in particular it will be seen that a portion of a plate has been illustrated, the plate being generally indicated by the numeral 21 with a primary design 22 thereon and comprising the highest surface level of the plate 21. The plate 21 has a secondary or background design 23 thereon covering all of the area thereof except that devoted to the primary design 22. The primary design 22 and the secondary or background design 23 represent different designs from different photographic negatives and lie on different planes as the secondary or background design 23 lies on a lower level than the plane of the primary design 22.

The plate shown in Figure 1 of the drawings may be used directly for embossing an article to carry the composite design or it may be used as a mold on which an article to be decorated may be formed.

In Figure 11 of the drawings a portion of a roll 24 may be seen, the surface of which has a primary design 25 on the highest level thereof and a secondary or background design 26 on a lower level thereof. The secondary or background design 26 covers all of the desired surface of the roll 24 with the exception of that portion occupied by the primary design 25. The roll 24 may be employed for directly embossing the primary and secondary designs on desired articles or articles to be decorated may be formed on said roll.

By referring now to Figures 2 through 10 of the drawings progressive illustrations illustrating enlarged end elevations of the principal steps of the method disclosed herein of producing the two-level photoengraving may be seen.

In Figure 2 of the drawings a metal plate 21 of zinc, copper or other metal is illustrated. A light sensitive solution is applied to the metal plate 21 to form a sensitized covering 27 as shown in Figure 3 of the drawings. The light sensitive solution may comprise a cold top or hot top enamel or an ink print.

A negative 28, such as a photographic half-tone negative, is then positioned on the sensitized plate, as shown in Figure 4 of the drawings, the plate exposed to a light source, the negative removed, and the plate developed, fixed and etched by a regular photoengraving process, as shown in Figure 5 of the drawings.

If desired, the etching may be interrupted and an intermediate step comprising the powdering of the plate four ways with a resinous powder known as dragon's blood may be utilized to avoid undercutting, as known in the art.

Following the above etching, as illustrated in Figure 5 of the drawings, the etched plate is re-coated with another flexible light sensitive solution to form a second sensitized covering 29, as shown in Figure 6 of the drawings, and a second negative 30 positioned thereover and the second sensitized covering 29 exposed to a light source, developed and fixed and the plate etched a second time by a regular photoengraving process as shown in Figures 7 and 8 of the drawings.

The second negative 30 shown in Figure 7 of the drawings carries a different design than the first negative 28, it being understood that the first negative 28 will form the primary design 22 and the second negative 30 will form the secondary or background design 23.

The remaining sensitized coverings are then removed and the two-level photoengraving plate is complete, as shown in Figures 9 and 10 of the drawings. It will be observed by referring to Figures 9 and 10 of the drawings that the uppermost level comprises the design of the first negative, as illustrated in Figure 4 of the drawings, and has the configuration of the primary design 22, as seen in Figure 1 of the drawings, while the second level comprises the configuration of the second negative, as seen in Figure 7 of the drawings, and extends over all of the desired surface of the plate around and about the primary design 22 and comprises the secondary or background design 23.

It will be seen that there is approximately the same height differential between the etched level of the first design and the original surface 20 of the plate as between the etched level of the first design and the etched level of the secondary design. In commercial production the depth of each of the etchings is approximately .004 of an inch.

It will thus be seen that the completed plate, after the removal of both sensitized coverings which act to protect various portions of the metal during the two etching actions, is thus capable of being used for embossing the two-level design or capable of being used as a mold for the formation of articles directly thereon and which articles will carry the design.

It will occur to those skilled in the art that in embossing materials, rolls may be desirably employed rather than plates, and it is accordingly an object of the present invention to provide for the formation of such rolls with the two-level photoengraving thereon.

By referring to the drawings and Figures 11 through 20 in particular, the detailed step-by-step process of producing the two-level etching on a roll may be seen.

In Figure 11 of the drawings the roll 24 carries the primary or uppermost design 25 and the secondary or background design 26.

In Figure 12 of the drawings a metal roll 24 is shown and in Figure 13 the same is provided with a light sensitive solution forming a sensitized covering 31 known in the photoengraving industry as cold top or hot top enamel.

In Figure 14 of the drawings a negative 32 is shown on the sensitized roll 24. It will occur to those skilled in the art that the coating of the roll 24 with the light sensitive solution to form the sensitized covering 31 follows the same procedure as hereinbefore disclosed in connection with the flat plate of Figures 1 through 10 of the drawings.

The sensitized covering 31 is progressively exposed to a light source through the negative 32, as shown in Figure 14 of the drawings, developed and fixed and etched by a regular photoengraving process as shown in Figure 15 of the drawings. The primary design 25 is thus formed on the surface of the roll 24. The roll 24 is then re-coated with a flexible light sensitive solution to form a second sensitized covering 33, it being observed that the portions of the first sensitized coating 31 on the primary design 25 still remains on the roll 24, as shown in Figure 16 of the drawings.

A second negative 34 showing the background design 26 is placed over the roll, as shown in Figure 17 of the drawings, and the second sensitized covering 33 exposed to a light source through the negative 34 and the roll etched the second time to impart thereto the design of the second negative and thereby create the background design 26 which extends over the usable surface of the roll excluding only those portions showing the primary design which exists on the uppermost level of the roll. The resulting two-level photoengraving is shown in Figure 18 of the drawings with the sensitized coverings 31 and 33 still covering the two levels of the primary and background designs. The sensitized coverings 31 and 33 are then removed, as shown in Figure 19 of the drawings, leaving the completed two-level photoengraved roll.

An enlarged detail of the segment of the roll of Figure 19 is shown in Figure 20 of the drawings, and by referring thereto it will be observed that the primary design 25 from the first negative 31 of Figure 13 of the drawings lies on the outermost level while the secondary or background design 26 of the second negative 34 of Figure 17 of the drawings lies on an adjacent lower level and that the roll is thus suitably engraved over its entire usable surface and usable for embossing various materials.

Those skilled in the art will recognize that the invention disclosed herein may be practiced with respect to objects other than the plate and roll hereinbefore described in detail. For example, a mold comprising a desirable shape of an article to be formed thereon or therein may be imparted with a two-level photoengraved surface in a primary and secondary design so that the molded product will carry the desired design as an integral part of its surface. For example, articles of latex rubber or similar plastic materials may be molded with desired surface ornamentation from molds or forms, the surfaces of which have been subjected to the two-level photoengraving process hereinbefore described and illustrated.

It will thus be seen that the several objects of the invention have been met by the two-level photoengraving of a plate, roll or other object and the method of performing the two-level photoengraving disclosed herein.

Having thus described my invention, what I claim is:

1. The method of producing a two-level photoengraved element comprising the steps of forming a first design from a first covering of light sensitive material which becomes etchant resistant under the action of light on a face of said element by placing negative in contact with said covering, subjecting the element to the action of light and developing and fixing said covering on the element, etching the element in the areas permitted by said developed and fixed covering, applying a second covering of said light sensitive material on said etched element which retains the developed and fixed covering previously applied, forming a second design from said second covering by placing a second negative having a design in areas corresponding to at least some of the areas not occupied by the first developed and fixed covering in contact with said second covering, subjecting the etched element to the action of light and developing and fixing the second covering on said element, etching said element in the areas permitted by said first and second coverings to produce said second design only in the areas of the element not occupied by the first produced, developed and fixed covering, and removing the etchant resistant material.

2. The method of producing a two-level photoengraved surface having a principal design and a secondary background design in a plate which comprises forming a first light sensitized covering on the plate, positioning a first negative having a first design on the sensitized plate, exposing the plate to a light source, removing the first negative, developing and fixing the first sensitized covering, and etching the plate in the areas permitted by said first covering to produce a principal design, applying a second light sensitized covering on the plate, positioning a second negative having a design in at least some areas other than the areas of design of the first negative on the re-sensitized plate, again exposing the plate to a light source, removing the second negative, developing and fixing the second sensitized covering, and etching the plate in the areas permitted by said first and second coverings to produce a secondary background design only in the areas of the plate not occupied by the principal design, and removing the coverings.

References Cited in the file of this patent

UNITED STATES PATENTS

| | | |
|---|---|---|
| 297,017 | Sachs | Apr. 15, 1884 |
| 567,030 | Kelsey et al. | Sept. 1, 1896 |
| 1,532,696 | Hassard et al. | Apr. 7, 1925 |
| 2,390,618 | Roehm | Dec. 11, 1945 |
| 2,639,660 | Sunderhauf et al. | May 26, 1953 |

FOREIGN PATENTS

| | | |
|---|---|---|
| 571,107 | Great Britain | Aug. 7, 1945 |
| 597,045 | Great Britain | Jan. 16, 1948 |
| 664,353 | Great Britain | Jan. 2, 1952 |